(12) United States Patent
Yamakawa (10) Patent No.: US 6,829,001 B2
(45) Date of Patent: Dec. 7, 2004

(54) IMAGE FORMING APPARATUS (75) Inventor: Takeshi Yamakawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/373,022

(22) Filed: Feb. 26, 2003

(65) Prior Publication Data
US 2003/0160860 A1 Aug. 28, 2003

(30) Foreign Application Priority Data
Feb. 28, 2002 (JP) ........................................ 2002-053929

(51) Int. Cl.⁷ ............................................. G02B 26/08
(52) U.S. Cl. ...................................... 347/261; 359/206
(58) Field of Search ................................ 347/241, 242, 347/243, 256, 257, 258, 259, 260, 261; 359/206, 204, 216

(56) References Cited

U.S. PATENT DOCUMENTS

| 4,745,416 A | * | 5/1988 | Horihata ..................... 347/261 |
| 4,996,561 A | | 2/1991 | Yoshimura et al. |
| 5,019,867 A | | 5/1991 | Yamakawa et al. |
| 5,200,611 A | * | 4/1993 | Hattori ....................... 250/235 |
| 5,382,129 A | | 1/1995 | Shimizu et al. |
| 5,587,813 A | | 12/1996 | Yamazaki et al. |
| 5,598,279 A | | 1/1997 | Ishii et al. |
| 5,610,651 A | | 3/1997 | Yamakawa et al. |
| 5,803,622 A | | 9/1998 | Mama et al. |
| 6,072,516 A | | 6/2000 | Yamakawa |
| 6,236,418 B1 | | 5/2001 | Yamakawa |
| 6,243,128 B1 | | 6/2001 | Yamakawa |
| 6,313,935 B1 | * | 11/2001 | Makino ....................... 359/206 |
| 6,501,586 B1 | * | 12/2002 | Takayama ................... 359/206 |
| 6,560,433 B1 | | 5/2003 | Yamakama |

FOREIGN PATENT DOCUMENTS

JP 5-150621 * 6/1993 ........... G02B/26/10

* cited by examiner

Primary Examiner—Huan Tran
(74) Attorney, Agent, or Firm—Oblon, Spivak, McClelland, Maier & Neustadt, P.C.

(57) ABSTRACT

The present invention provides a device for forming an image on a photoconductive image carrier in an image forming apparatus. The device comprises a light source for generating a light beam, an aperture for shaping the light beam generated by the light source, a deflector (polygon mirror) for deflecting the light beam shaped by the aperture, and an optical scanning imaging part for focusing the light beam deflected by the deflector onto the photoconductive image carrier as an optical spot and forming an image thereon. The deflector is provided with at least one blocking member (first blocking plate) for blocking flare beams that do not contribute to image formation. Further blocking members (auxiliary blocking plate and second blocking plate) may be provided to stationary parts of the device so as to block leaked light beams.

14 Claims, 6 Drawing Sheets

IMAGE FORMING APPARATUS

BACKGROUND OF THE INVENTION

1. Field of the Invention

The present invention generally relates to an image forming apparatus such as a digital copier, a printer, a facsimile and so on of an electric photographic type, provided with a writing device that performs image exposure on a photoconductive image carrier by deflecting a light beam emitted from a light source by a deflector.

2. Description of the Related Art

A brief description of the schematic configuration of such an image forming apparatus is given below by taking a digital copier as an example. The digital copier of an electric photographic type includes an automatic document feeder that feeds document sheets one by one from a pile of document sheets onto a contact glass and sets the document sheet thereon. The digital copier further includes an image reading unit that optically scans the document sheet on the contact glass and forms an image on a CCD sensor, and an optical scan unit that forms an (electrostatic latent) image on a photoconductive image carrier by deflecting a light beam emitted from a light-emitting semiconductor based on a digital image signal. The digital image signal is converted from an analog image signal that is obtained by photoelectrically transforming a reflective light image of the document sheet formed on the CCD sensor by an analog-to-digital converter. The digital copier further includes a transfer unit that transfers an image developed from the electrostatic latent image formed on the photoconductive image carrier onto a transfer paper and a feeder unit that feeds transfer papers to the transfer unit.

Figure 1:
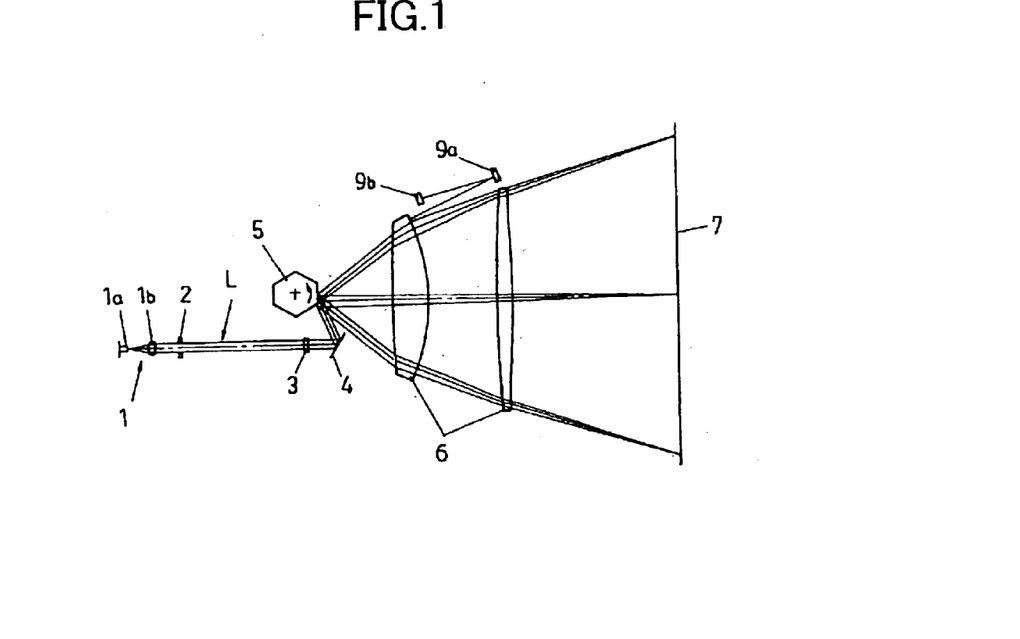
FIG. 1 is an optical path diagram illustrating one example of a writing device according to the related art.

Among these components, the optical scan unit that configures a writing device may be exemplified by an optical scanning system shown in FIG. 1. A laser beam emitted from a semiconductor laser (LD) 1a, which is provided in the interior of a semiconductor laser unit (LD unit) 1 as a light source, become a substantially parallel-light beam by passing through a collimator lens 1b and become a chief ray L having a cross-section shaped as necessary for image formation by an aperture 2. The chief ray is condensed in the sub-scanning direction by a cylindrical lens 3 and is reflected by a mirror 4 so as to enter a polygon mirror 5, which serves as a deflector. The chief ray L entering the polygon mirror 5 is deflected by the reflective side surface of the polygon mirror 5 that rotates with a high velocity in the direction indicated by the arrow, and the deflected chief ray L enters an Fθ lens 6. By entering the Fθ lens 6, the constant angular velocity scanning with the chief ray is transformed into constant linear velocity scanning with the same. The chief ray exits to the exterior of the writing device and is focused on a photoconductor drum 7, which includes the surface to be scanned and thus an electrostatic latent image is formed thereon. In FIG. 1, the numerical references 9a and 9b represent a synchronism detection mirror provided outside of the image region and a synchronism detection sensor that detects a reflection beam from the synchronism detection mirror, respectively. A synchronization signal as a reference for the beginning of scanning in the main scanning direction can be obtained from the output of the synchronism sensor 9b. In addition, the Fθ lens 6 has an optical face tangle correction function.

Figure 2:
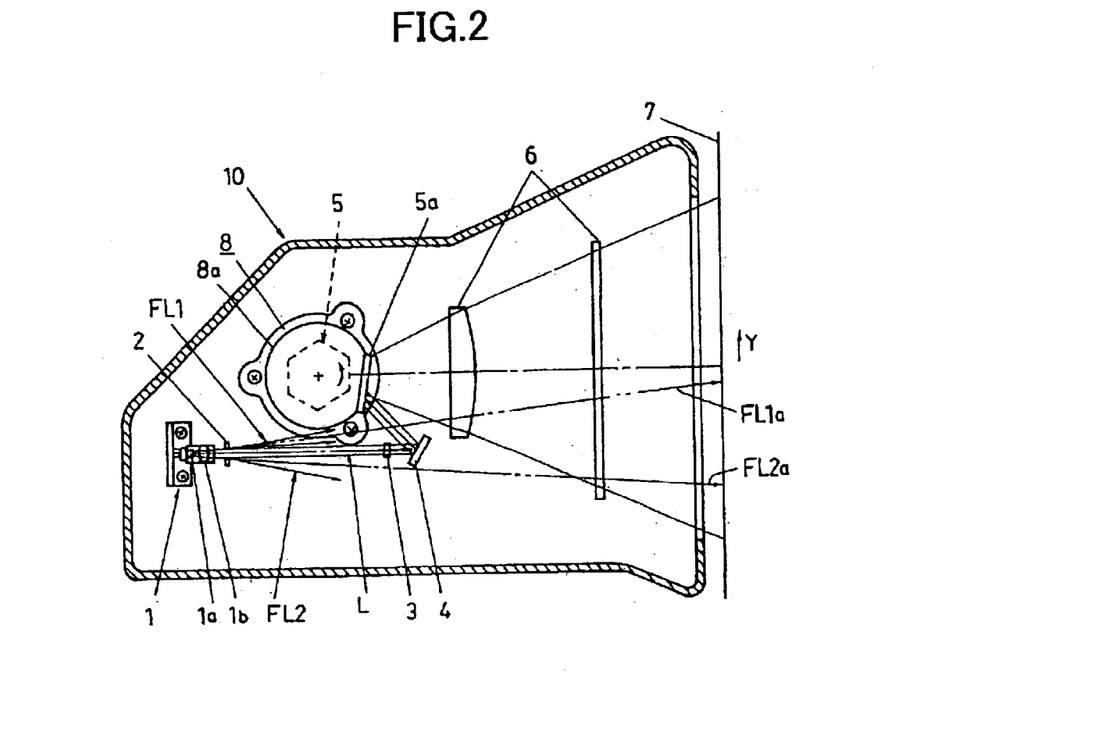
FIG. 2 is a top plan view of one example of the writing device according to the related art.
Figure 3:
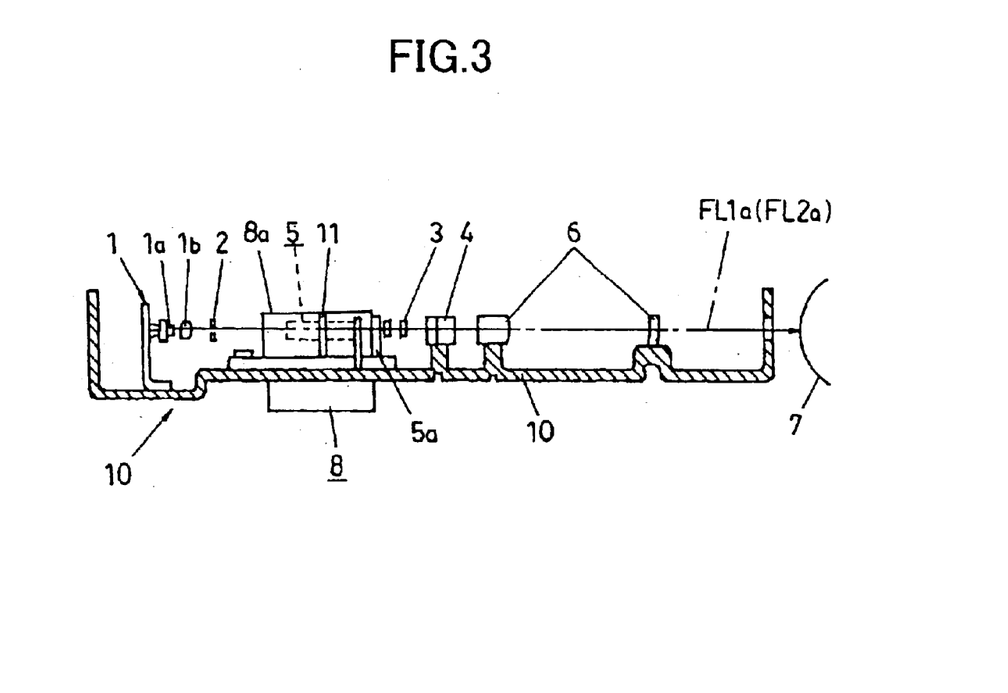
FIG. 3 is a sectional side view of one example of the writing device according to the related art.

FIG. 2 and FIG. 3 show a configuration of one example of the writing device 10 provided with the above-mentioned optical scanning system. FIG. 2 is a top plan view of such a configuration and FIG. 3 is a sectional side view of such a configuration. As is apparent from FIG. 2 and FIG. 3, in the actual writing device 10, the polygon mirror 5 is rotationally driven by a polygon motor 8. A soundproof glass 5a is fastened to a polygon cover 8a of the polygon motor 8. The light beam entering the polygon mirror 5 from the mirror 4 and the light beam exiting the polygon mirror 5 to the Fθ lens 6 pass through the soundproof glass 5a. The rotational velocity of the polygon mirror 5 is determined based on the rotational velocity of the photoconductor drum 7, the writing density of the writing device 10, and the number of side surfaces on the polygon mirror 5.

Figure 4:
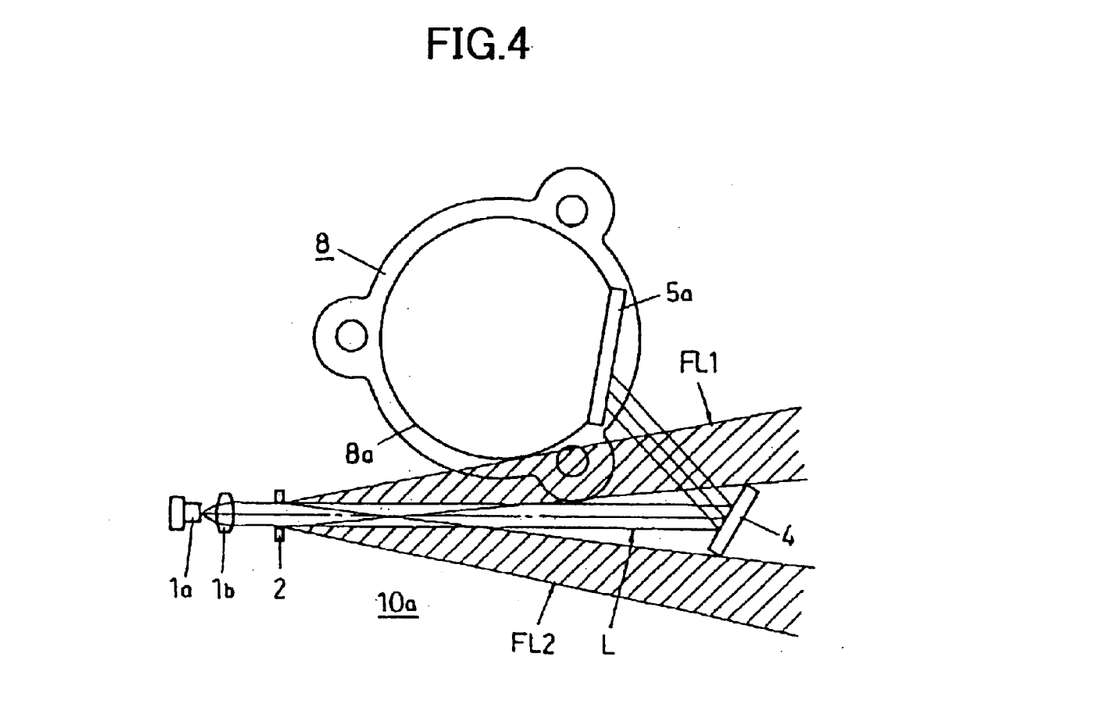
FIG. 4 is a magnified view of a part of one example of the writing device shown in FIG. 2.

However, in such a writing device of the image forming apparatus according to the related art, some undesired light beam may occur from the LD unit 1, which light beam is different from the chief ray L and does not contribute to the proper image formation, due to the side lobes occurring from the LD 1a and being reflected internally of the LD unit 1, etc. The undesired light beam is represented as flare beams FL 1, FL 2 in FIG. 2. These flare beams appear on both sides of the traveling direction of the chief ray L. FIG. 4 shows a magnified view of a part of the optical path of these flare beams. It is often the case that the energy of the first flare beam FL 1 and the energy of the second flare beam FL 2 are smaller than that of the chief ray L. However, if they travel at the same height as the chief ray L, the first flare beam FL 1 passes through the gap between one end of the mirror 4 and the cover 8a of the polygon motor 8 and the second flare beam FL 2 travels on the side of the chief ray L, which side is outer with respect to the other end of the mirror 4 as shown in FIG. 2 and FIG. 4. Both flare beams pass through the Fθ lens 6 shown in FIG. 2 and become flare beams FL 1a, FL 2a that reach the photoconductor drum 7. The flare beams FL 1a, FL 2a always expose themselves to the photoconductor drum 7 as a certain image height and these flare beams form on finally obtained image black lines or black bands in the sub-scanning direction, therefore the image quality is significantly degraded. These flare beams may also be generated at both the upper side and the under side of the chief ray; however, such flare beams are blocked by an optical housing or a cover member that accommodates most of the optical devices and therefore they do not reach the photoconductor drum 7.

SUMMARY OF THE INVENTION

Accordingly, it is necessary to prevent the first flare beam and the second flare beam from reaching the photoconductor drum by blocking the relevant flare beams. However, when the first flare beam FL 1 and the second flare beam FL 2 are traveling on the same scanning plane as the chief ray L and the parts FL1a, FL 2a of the first flare beam FL 1 and the second flare beam FL 2 enter the scan region of the chief ray L as shown in FIG. 2, it is difficult to separate the flare beams from the chief ray L. Accordingly, it is necessary to block the first flare beam FL 1 and the second flare beam FL 2 in the optical path between the LD unit 1 and the polygon mirror 5.

In particular, for blocking the first flare beam FL 1, it is necessary to arrange a blocking member between the polygon motor 8 and the mirror 4 avoiding obstructing the traveling of the chief ray L and this is spatially difficult. Further, the polygon motor 8 is removably mounted to the housing of the writing device 10 by screws threaded in the direction perpendicular to the plane of the figure so that the polygon motor can be replaced in case of a failure, etc. However, under a certain design condition, the blocking member may obstruct the removal of the polygon motor and thus may impede a smooth removal of the polygon motor. Therefore, it is extremely difficult to completely block the first flare beam FL 1 by providing a blocking member between the motor 8 and the mirror 4 leaving no space between them, while avoiding obstructing the removal of the motor 8 and blocking the chief ray L.

The present invention is proposed in view of the mentioned problems, and therefore, it is a general object of the present invention to provide an image forming apparatus provided with a writing device with a simple configuration, by means of which writing device the flare beams emitted from the LD unit can be effectively blocked.

According to a first aspect of the present invention, there is provided a device for forming an image on a photoconductive image carrier in an image forming apparatus. The device according to the present invention comprises a light source for generating a light beam, an aperture for shaping the light beam suitable for proper image formation, which light beam is generated by the light source, a deflector assembly for deflecting the light beam shaped by the aperture, an optical scanning imaging part for focusing the light beam deflected by the deflector assembly onto the photoconductive image carrier as an optical spot and forming an image thereon, and a blocking member provided on an optical path between the aperture and the deflector assembly for blocking a light beam that does not contribute to the proper image formation.

In the device according to the present invention, the deflector assembly may comprise a polygon mirror, a polygon motor that rotationally drives the polygon mirror, and a polygon cover that accommodates the polygon mirror and the polygon motor therein, and the blocking member may be integrally formed on the polygon cover.

Therefore, according to the first aspect of the present invention, by providing the blocking member on the optical path between the aperture and the deflector assembly, it is possible to effectively and efficiently block the undesired light beam that dose not contribute to the proper image formation and therefore it is possible to improve the image quality of the finally obtained image.

According to a second aspect of the present invention, there is provided another device for forming an image on a photoconductive image carrier in an image forming apparatus. The device according to the present invention comprises a light source for generating a light beam, a deflector assembly for deflecting the light beam generated by the light source, an optical scanning imaging part for focusing the light beam deflected by the deflector onto the photoconductive image carrier as an optical spot and forming an image thereon, and a blocking member integrally formed on the deflector assembly for blocking a light beam that does not contribute to the proper image formation.

In the device according to the present invention, the deflector assembly may comprise a polygon mirror, a polygon motor that rotationally drives the polygon mirror, and a polygon cover that accommodates the polygon mirror and the polygon motor therein, and the blocking member may be integrally formed on the polygon cover.

In the device according to the present invention, the blocking member may be formed with an opening that allows only a light beam that contributes to the proper image formation to pass therethrough, and the opening may function as an aperture for shaping the light beam suitable for the proper image formation, which light beam is generated by the light source.

Therefore, according to the present invention, an independent aperture may be dispensed with, which aperture is present in the related art, and a fewer number of components may be necessary for the device for forming an image on the photoconductive image carrier according to the present invention.

In the device according to the present invention, the opening formed in the blocking member may have a dimension that can be determined correspondingly to a rotational velocity of the polygon motor.

In the device according to the present invention, the blocking member may be provided on an optical path between the light source and the deflector assembly.

Therefore, according to the second aspect of the present invention, by integrally forming the blocking member on the polygon cover that configures a part of the deflector assembly, it is possible to readily remove the deflector assembly for replacement, etc. without the blocking member obstructing the removal of the deflector assembly.

When the first aspect and the second aspect of the present invention are considered together, it is possible to provide a device for forming an image on a photoconductive image carrier in an image forming apparatus, which device can effectively and efficiently block the undesired light beam that does not contribute to the proper image formation and, at the same time, the deflector assembly that configures a part of the device according to the present invention can be readily removed from the device when necessary without being obstructed by the blocking member.

As a third aspect of the present invention, there is provided an image forming apparatus that comprises a document feeder that feeds document sheets one by one from a pile of document sheets onto a contact glass and sets the document sheet thereon, an image reading unit that optically scans the document sheet and forms an image corresponding to the document sheet on a sensor, an optical scan unit that forms a latent image on a photoconductive image carrier based on a digital image signal provided from the sensor via an analog-to-digital converter, a transfer unit that transfers an image developed from the latent image formed on the photoconductive image carrier onto a transfer paper, and a feeder unit that feeds the transfer paper to the transfer unit. The optical scan unit comprises the above-mentioned device for forming an image on the photoconductive image carrier according to the first and the second aspects of the present invention.

By configuring the image forming apparatus as mentioned above, it is possible to efficiently and effectively block undesired light beams that impede image formation by way of an extremely simple configuration, and thus the image quality of the finally obtained image can be significantly improved.

DETAILED DESCRIPTION OF THE PREFERRED EMBODIMENTS

In the following, preferred embodiments of the present invention are more specifically described with reference to the accompanying figures.

Figure 5:
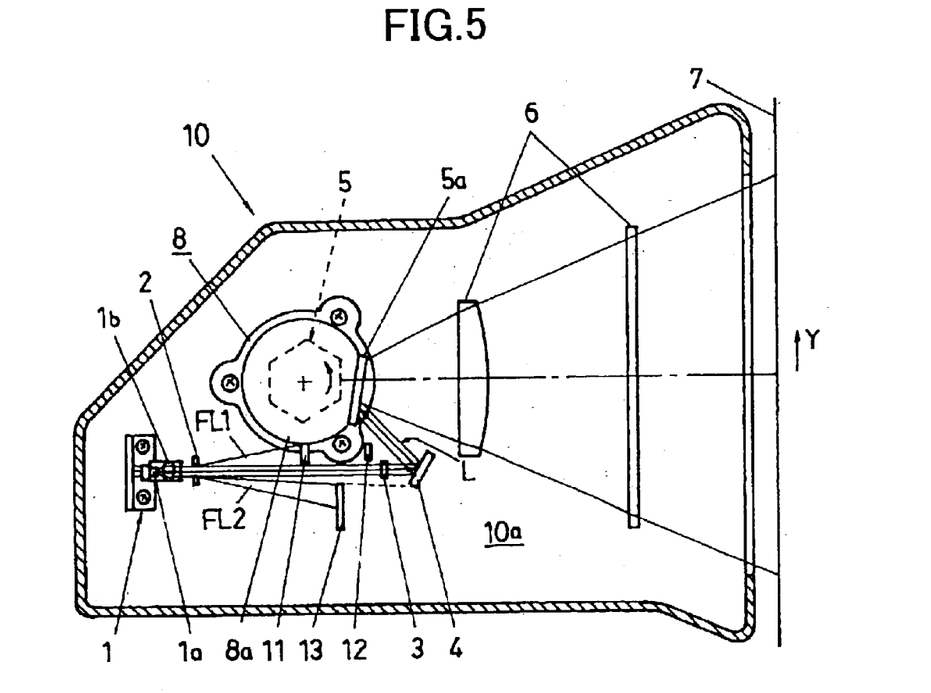
FIG. 5 is a plan view of a writing device according to a first embodiment of the present invention.
Figure 6:
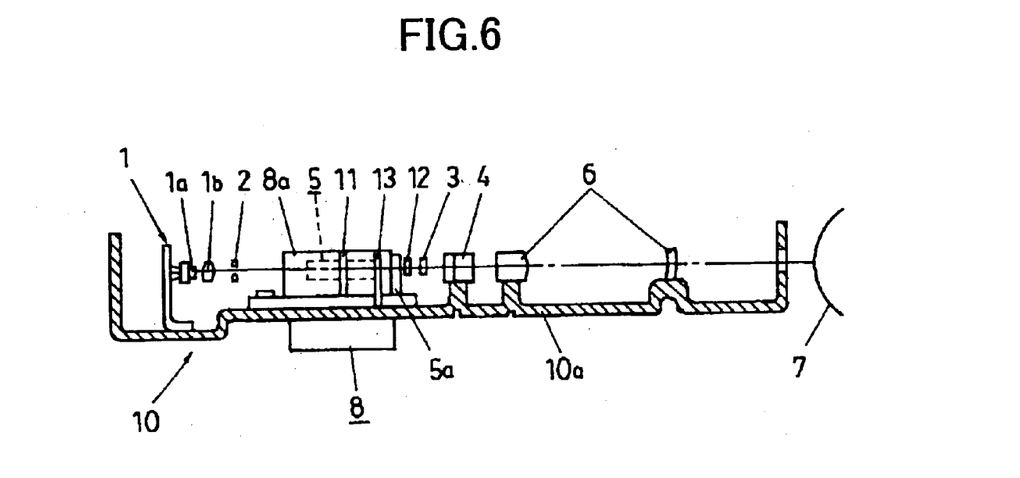
FIG. 6 shows a sectional side view of the writing device according to the first embodiment of the present invention.

FIG. 5 is a plan view of a writing device according to a first embodiment of the present invention and FIG. 6 is a sectional side view of the writing device according to the first embodiment. Parts corresponding to those shown in FIG. 2 and FIG. 4 are denoted with the same numerical references and the descriptions of which are omitted.

In the writing device 10 according to the first embodiment of the present invention, a first blocking plate 11 is integrally formed on the polygon cover 8a of the polygon motor 8 so as to block the first flare beam FL 1. This eliminates the possibility of forming a gap between the first blocking plate 11 and the polygon cover 8a of the polygon motor 8, and at the same time, the removal of the polygon motor 8 is not obstructed since the first blocking plate 11 is simultaneously removed with the polygon motor 8. Since the polygon mirror 5 is normally arranged with high precision with respect to the LD unit 1 and other optical components, it is possible to arrange the first blocking plate 11 at the ultimate position where the first blocking plate 11 can block the first flare beam FL 1 but does not block the chief ray L.

However, since the distance between the first blocking plate 11 and the aperture 2 is shorter than the distance between the first blocking plate 11 and the mirror 4, there is a possibility that a part of the first flare beam FL 1 may pass through due to a slight error. Therefore, it is preferable that an auxiliary blocking plate 12 may be provided in parallel with the first blocking plate 11 on the optical housing 10a of the writing device 10 between the first blocking plate 11 and the mirror 4 in order to completely block the first flare beam FL 1. The auxiliary blocking plate 12 may be also integrally formed on the polygon cover 8a of the polygon motor 8 as is the first blocking plate 11.

Figure 7:
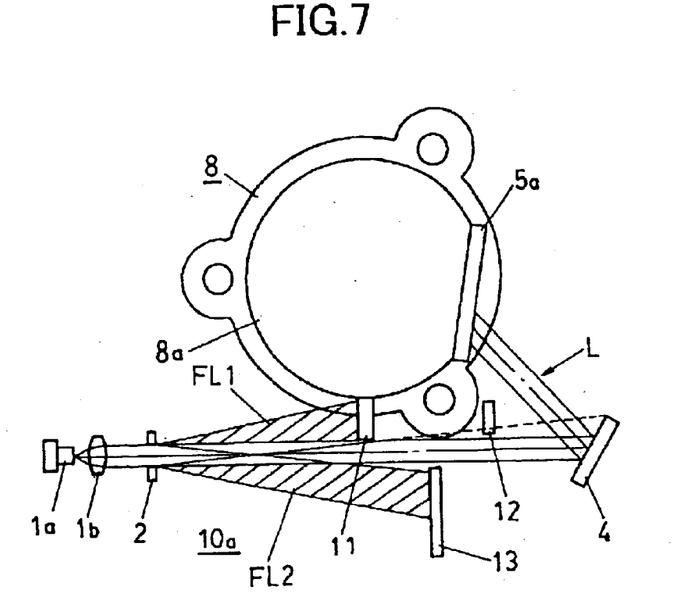
FIG. 7 is a magnified view of a part of the writing device according to the first embodiment of the present invention.

As for the second flare beam FL 2, as shown in FIG. 7, a second blocking plate 13 is provided on the optical housing 10a of the writing device 10 as is the auxiliary blocking plate 12. The second blocking plate 13 can be arranged comparatively easily since there are no particular intricate movable/stationary members in its surroundings.

According to the first embodiment of the present invention, it is possible to achieve an efficient and effective blocking of the flare beams emitted from the LD unit, which is conventionally said to be very difficult, and to prevent the degradation in image quality by simply modifying a part of the shape of the polygon cover 8a of the polygon motor 8 configuring the deflector.

Figure 8:
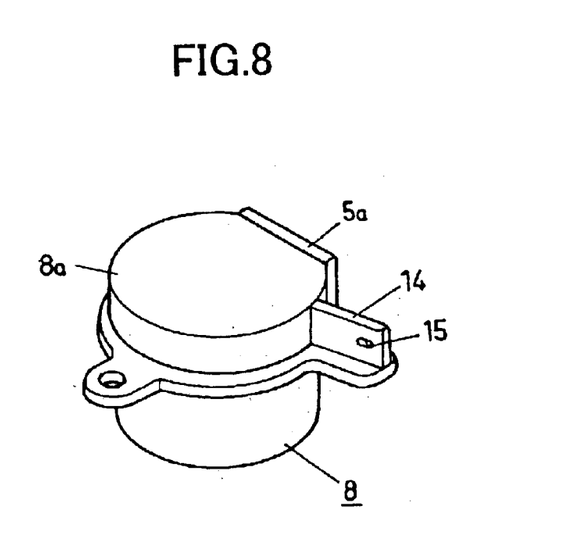
FIG. 8 is a perspective view of a polygon motor in a writing device according to a second embodiment of the present invention.
Figure 9:
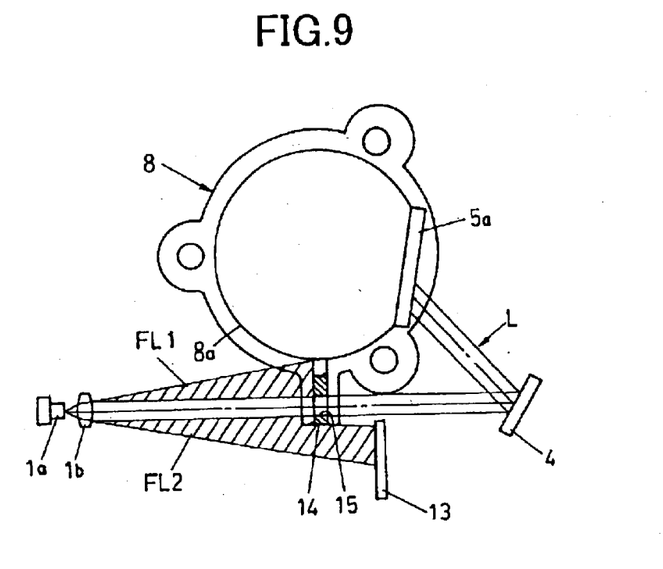
FIG. 9 is a magnified view of a part of the writing device according to the second embodiment of the present invention.
Figure 10:
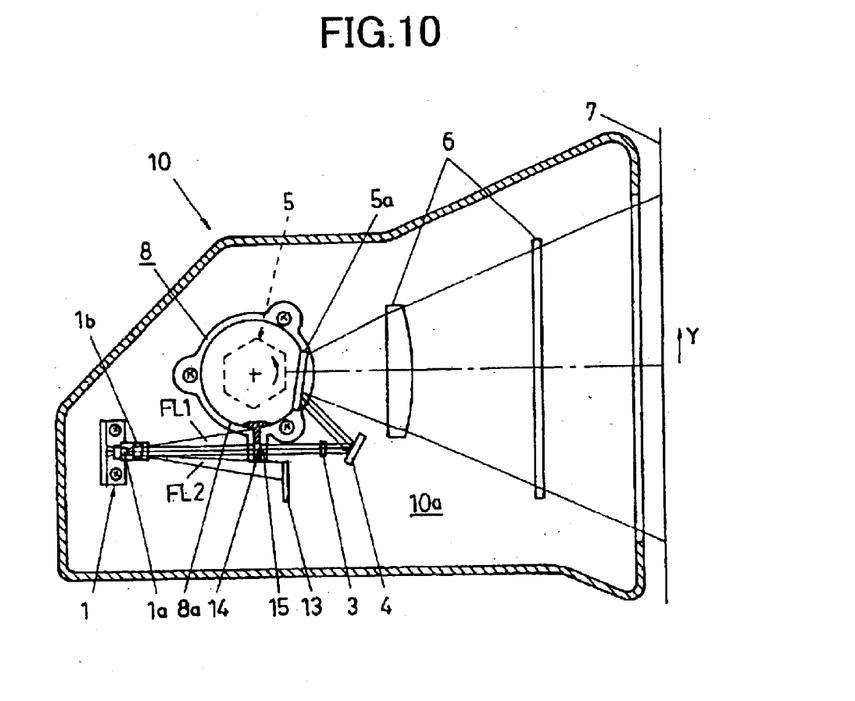
FIG. 10 is a plan view of an overall configuration of the writing device according to the second embodiment of the present invention.

FIG. 8 through FIG. 10 describe a writing device according to a second embodiment of the present invention. FIG. 8 is a perspective view illustrating the exterior of the cover of the polygon motor in the writing device according to the second embodiment. FIG. 9 shows a magnified view of a part of the optical path of the flare beams in the surroundings of the polygon motor. FIG. 10 is a plan view illustrating an overall configuration of the writing device according to the second embodiment.

According to the second embodiment of the present invention, a first blocking plate 14, which is integrally formed on the polygon cover 8a of the polygon motor 8, is extended to a position across the chief ray L. An opening 15 with a predetermined shape for allowing the chief ray L to pass therethrough is formed in the first blocking plate 14. The opening 15 substitutes for the aperture 2 for forming the chief ray L and thus the independent aperture 2 such as shown in FIG. 5 and FIG. 6 is eliminated. As previously mentioned, since the arrangement accuracy of the polygon motor 8 is essentially very high, the position accuracy the first blocking plate 14 that is integrally formed on the polygon motor 8 and the opening 15 formed in the blocking plate 14 is also high. It is possible to make the opening 15 sufficiently fulfill the function of an aperture. Since the first flare beam FL 1 emitted from the LD unit 1 is reliably blocked by the portions of the first blocking plate 14 other than the opening 15, the auxiliary blocking plate 12 provided in the first embodiment of the present invention is not necessary any more. As for the second flare beam FL 2, the second blocking plate 13 as shown in FIG. 5 and FIG. 7 is provided. According to the second embodiment of the present invention, since the function of the aperture, which is conventionally provided in the LD unit 1 or on the optical housing 10a as an independent member, can be combined with the opening 15 in the first blocking plate 14, it is possible to reduce the production cost in addition to the blocking of the flare beams.

Accordingly, by integrally forming an opening having the function of the aperture on the polygon cover of the polygon motor, further effects can be obtained as described below.

In general, when the writing densities of the plurality of image forming apparatus differ, it is necessary to change the diameter of the beam incident on the photoconductor drum as required by the image formation process. For example, an image forming apparatus with a writing density of 600 dpi needs a smaller beam diameter than an image forming apparatus with a writing density of 400 dpi. In order to obtain the required beam diameter, an appropriate LD unit and superior performance of the lens system that focuses the laser beam emitted from the LD unit onto the photoconductor and forms images thereon are essential. However, as a method for changing the beam diameter without modifying the lens system, changing the shape or the dimension of the aperture may be effectively implemented.

For example, in order to configure a plurality of device types having different writing densities as series devices of the image forming apparatus, it may be only necessary to change the number of rotations of the polygon motor and the shape of the opening from an optical point of view. According to the second embodiment of the present invention shown in FIG. 8 through FIG. 10, since the polygon cover 8a of the polygon motor 8 and the opening 15 configuring the aperture of the first blocking plate 14 are integrally formed on the same component, it is possible to readily achieve the configurations of the series devices by combining a plurality of polygon motors having different numbers of rotations and a plurality of openings having different dimensions during production. In addition, it is possible to provide an image forming apparatus with a plurality of grades by simply replacing the above-mentioned integral component. Therefore, it is possible to achieve good productivity.

Figure 11:
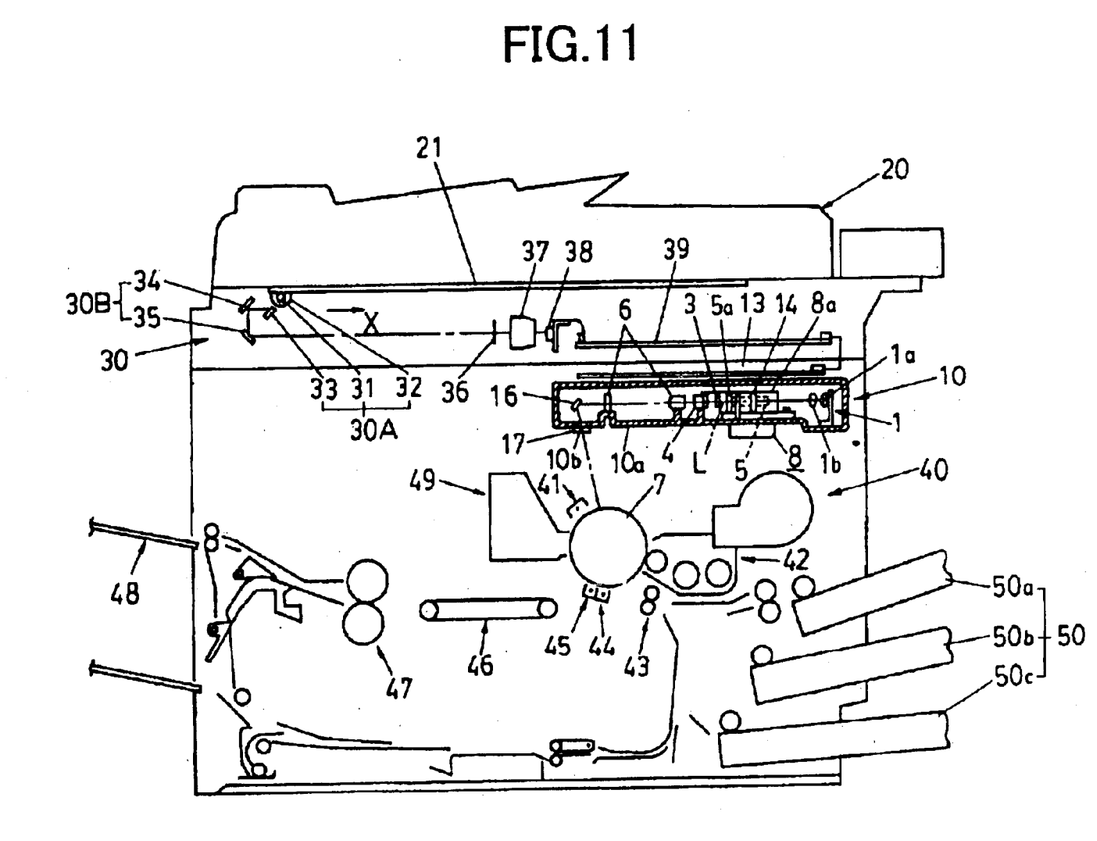
FIG. 11 is a schematic configuration illustrating a digital copier provided with the writing device according to the second embodiment of the present invention.

FIG. 11 shows a schematic configuration of a digital copier provided with such a writing device as mentioned above. It is noted that, as a matter of convenience, the writing device 10 has an optical path that travels in the opposite direction as compared to that shown in FIG. 6. The writing device 10 is configured as shown in FIG. 8 through FIG. 10.

The digital copier comprises, from the top to the bottom, the automatic document feeder 20, the document reading unit 30, the writing device 10, the transfer unit 40, and the feeder unit 50. The automatic document feeder 20 feeds document sheets one by one from a pile of document sheets placed on a table for the document sheets (not shown) to the contact glass 21 and discharges the document sheet when it is finished copying. The document reading unit 30 comprises a first carriage 30A provided with a light source configured from an illumination lamp 31 and a reflection mirror 32, and a first mirror 33 and a second carriage 30B provided with a second mirror 34 and a third mirror 35. At the time of reading out the document sheet, the first carriage 30A moves in the direction indicated by an arrow X with predetermined velocity and the second carriage 30B follows the first carriage 30A in the direction indicated by the arrow X at half of the predetermined velocity of the first carriage 30A. This enables the document sheet on the contact glass 21, which is illuminated by the illumination lamp 31 provided with the reflection mirror 32, to be optically scanned, and a corresponding image is formed on the CCD sensor 38 through a color filter 36 and a lens 37.

The document sheet is read by the CCD sensor 38, which performs the photoelectric transfer on the reflective light image of the document sheet so as to provide an analog signal. After reading of the document sheet is completed, the first carriage 30A and the second carriage 30B return to their original positions. When a 3-line CCD provided with a red (R) filter, a green (G) filter, and a blue (B) filter is used as the CCD sensor 38, color images can be read. The analog image signals provided from the CCD sensor 38 are converted to digital image signals by an A/D converter and various image processes including digitization, a gradation process, a magnification process, and a compilation process are applied on the digital image signals at an image processing plate 39. The digital image signals having been processed are sent to the writing device 10 via a semiconductor drive plate (not shown) and a laser beam is emitted from the LD 1a in the LD unit 1 in accordance with the provided digital signals.

As previously mentioned, the laser beam emitted from the LD 1a becomes a substantially parallel light beam by passing through the collimator lens 1b and become a chief ray L having a cross-section shaped as necessary for image formation by the opening 15 (FIG. 9) of the first blocking plate 14. The first flare beam FL 1 and the second flare beam FL 2 (FIG. 9) other than the chief ray L are blocked by the first blocking plate 14 and the second blocking plate 13. The chief-ray that passes through the opening 15 is condensed in the sub-scanning direction by the cylindrical lens 3 and is reflected by the mirror 4 so as to enter the polygon mirror 5 via the soundproof glass 5a. The chief ray L entering the polygon mirror 5 is deflected by the polygon mirror 5 and enters the Fθ lens 6. The direction of the chief ray L is changed by a turning mirror 16 and the chief ray L exits to the interior of the transfer unit 40 through a window portion 10b of the optical housing 10a and a dustproof glass 17.

The chief ray L emitted to the interior of the transfer unit 40 is focused on the photoconductive image carrier, which is the photoconductor drum 7, and forms an image thereon. The photoconductor drum 7 is rotationally driven by a drive (not shown) during copying and uniformly charged by a charging device 41. Afterward, electrostatic latent images are formed by being exposed to the image light beams from the writing device 10 and the latent images are developed by a developing device 42.

Meanwhile, the feeder unit 50 comprises a plurality of feeding cassettes 50a, 50b, and 50c corresponding to different dimensions. Transfer papers are fed to resist rollers 43 from the required feeding cassette in precise timing with the images on the photoconductor drum 7. The latent images formed on the photoconductor drum 7 are transferred to the transfer paper by a transfer device 44 and the transfer paper is separated from the photoconductor drum 7 by a separation device 45. After being conveyed by a conveying device 46, the transfer paper is discharged into a tray 48 as a copy. Remaining toner is removed from the photoconductor drum 7 by a cleaning device 49 after the transfer paper is separated therefrom.

In the digital copier shown in FIG. 11, a double-side copier, etc. may be provided inside, however, the descriptions of which are omitted since they are not directly related to the present invention.

Further, the present invention is not limited to these embodiments, and variations and modifications may be made without departing from the scope of the present invention.

The present application is based on Japanese priority application No. 2002-053929 filed on Feb. 28, 2002, the entire contents of which are hereby incorporated by reference.

What is claimed is:

1. A device for forming an image on a photoconductive image carrier in an image forming apparatus, said device comprising:

a light source for generating a light beam;

an aperture for shaping the light beam suitable for proper image formation, which light beam is generated by said light source;

a deflector assembly for deflecting the light beam shaped by said aperture;

an optical scanning imaging part for focusing the light beam deflected by said deflector assembly onto the photoconductive image carrier as an optical spot and forming an image thereon; and a blocking member provided on an optical path of a light beam chiefly contributing to the proper image formation and lying linearly between said aperture, a mirror, and said deflector assembly in the stated order, for blocking a light beam that does not contribute to the proper image formation.

2. The device as claimed in claim 1, wherein:

said deflector assembly comprises a polygon minor, a polygon motor that rotationally drives said polygon mirror, and a polygon cover that accommodates said polygon mirror and said polygon motor therein; and said blocking member is integrally formed on said polygon cover.

3. A device for forming an image on a photoconductive image carrier in an image forming apparatus, said device comprising:

a light source for generating a light beam;

a deflector assembly for deflecting the light beam generated by said light source;

an optical scanning imaging part for focusing the light beam deflected by said deflector assembly onto the photoconductive image carrier as an optical spot and forming an image thereon; and a blocking member integrally formed on said deflector assembly and provided on an optical path of a light beam chiefly contributing to proper image formation and lying linearly between said light source, a mirror, and said deflector assembly in the stated order, said blocking member blocking a light beam that does not contribute to the proper image formation.

4. The device as claimed in claim 3, wherein:

said deflector assembly comprises a polygon mirror, a polygon motor that rotationally drives said polygon mirror, and a polygon cover that accommodates said polygon mirror and said polygon motor therein; and said blocking member is integrally formed on said polygon cover.

5. An image forming apparatus comprising:

a document feeder that feeds a document sheet one by one from a pile of document sheets onto a contact glass and sets the document sheet thereon;

an image reading unit that optically scans the document sheet and forms an image corresponding to the document sheet on a sensor via an analog-to-digital converter;

an optical scan unit that forms a latent image on a photoconductive image carrier based on a digital image signal provided from the sensor;

a transfer unit that transfers an image developed from the latent image formed on the photoconductive image carrier onto a transfer paper; and a feeder unit that feeds the transfer paper to said transfer unit; wherein, said optical scan unit comprises the device claimed in claim 3.

6. A device for forming an image on a photoconductive image carrier in an image forming apparatus, said device comprising:

a light source for generating a light beam;

a deflector assembly for deflecting the light beam generated by said light source;

an optical scanning imaging part for focusing the light beam deflected by said deflector assembly onto the photoconductive image carrier as an optical spot and forming an image thereon; and a blocking member integrally formed on said deflector assembly for blocking a light beam that does not contribute to the proper image formation, wherein:

said deflector assembly comprises a polygon mirror, a polygon motor that rotationally drives said polygon mirror, and a polygon cover that accommodates said polygon mirror and said polygon motor therein;

said blocking member is integrally formed on said polygon cover;

said blocking member is formed with an opening that allows only a light beam that contributes to the proper image formation to pass therethrough; and said opening functions as an aperture for shaping a light beam suitable for the proper image formation, which light beam is generated by said light source.

7. The device as claimed in claim 6, wherein:

said opening formed in said blocking member has a dimension that can be determined correspondingly to a rotational velocity of said polygon motor.

8. A device for forming an image on a photoconductive image carrier in an image forming apparatus, said device comprising:

means for generating a light beam;

means for shaping the light beam suitable for proper image formation, which light beam is generated by said light generating means;

means for deflecting the light beam shaped by said shaping means;

means for focusing the light beam deflected by said deflecting means onto the photoconductive image carrier as an optical spot and for forming an image thereon; and blocking means provided on an optical path of a light beam chiefly contributing to the proper image formation and lying linearly between said shaping means, reflection means, and said deflecting means in the stated order, for blocking a light beam that does not contribute to the proper image formation.

9. The device as claimed in claim 8, wherein:

said deflecting means comprises a polygon mirror, a polygon motor that rotational drives said polygon mirror, and a polygon cover that accommodates said polygon mirror and said polygon motor therein; and said blocking means is integrally formed on said polygon cover.

10. A device for forming an image on a photoconductive image carrier in an image forming apparatus, said device comprising:

means for generating a light beam;

means for deflecting the light beam generated by said light generating means;

means for focusing the light beam deflected by said deflecting means onto the photoconductive image carrier as an optical spot and forming an image thereon; and blocking means integrally formed on said deflecting means and provided on an optical path of a light beam chiefly contributing to proper image formation and lying linearly between said means for generating a light beam, reflection means, and said means for deflecting in the stated order, said blocking means blocking a light beam that does not contribute to the proper image formation.

11. The device as claimed in claim 10, wherein:

said deflecting means comprises a polygon mirror, a polygon motor that rotationally drives said polygon mirror, and a polygon cover that accommodates said polygon mirror and said polygon motor therein; and blocking member is integrally formed on said polygon cover.

12. A device for forming an image on a photoconductive image carrier in an image forming apparatus, said device comprising:

means for generating a light beam;

means for deflecting the light beam generated by said light generating means;

means for focusing the light beam deflected by said deflecting means onto the photoconductive image carrier as an optical spot and forming an image thereon; and blocking means integrally formed on said deflecting means for blocking a light beam that does not contribute to proper image formation, wherein:

said deflecting means comprises a polygon mirror, a polygon motor that rotationally drives said polygon mirror, and a polygon cover that accommodates said polygon mirror and said polygon motor therein;

blocking member is integrally formed on said polygon cover;

said blocking means is formed with an opening that allows only a light beam that contributes to the proper image formation to pass therethrough; and said opening functions as shaping means for shaping a light beam suitable for the proper image formation, which light beam is generated by said light generating means.

13. The device as claimed in claim 12, wherein:
said opening formed in said blocking means has a dimension that can be determined correspondingly to a rotational velocity of said polygon motor.

14. An image forming apparatus comprising:
a document feeder that feeds a document sheet one by one from a pile of document sheets onto a contact glass and sets the document sheet thereon;

an image reading unit that optically scans the document sheet and forms an image corresponding to the document sheet on a sensor via an analog-to-digital converter;

an optical scan unit that forms a latent image on a photoconductive image carrier based on a digital image signal provided from the sensor;

a transfer unit that transfers an image developed from the latent image formed on the photoconductive image carrier onto a transfer paper; and a feeder unit that feeds the transfer paper to said transfer unit; wherein, said optical scan unit comprises the device claimed in claim 1.

* * * * *